(12) United States Patent
Dagenais

(10) Patent No.: US 8,313,016 B2
(45) Date of Patent: Nov. 20, 2012

(54) METHOD AND DEVICE FOR POSITIONING A FIRST PIPE WITH RESPECT TO A SECOND PIPE

(76) Inventor: Jean-François Dagenais, Cassis (FR)

( * ) Notice: Subject to any disclaimer, the term of this patent is extended or adjusted under 35 U.S.C. 154(b) by 0 days.

(21) Appl. No.: 13/073,548

(22) Filed: Mar. 28, 2011

(65) Prior Publication Data

US 2012/0074205 A1     Mar. 29, 2012

(30) Foreign Application Priority Data

Sep. 24, 2010  (FR) ...................................... 10 57723

(51) Int. Cl.
 *B23K 37/04*    (2006.01)
(52) U.S. Cl. ........................... 228/9; 228/44.5; 228/49.3
(58) Field of Classification Search .................. None
 See application file for complete search history.

(56) References Cited

U.S. PATENT DOCUMENTS

| | | | |
|---|---|---|---|
| 2,667,356 A * | 1/1954 | Foward ........................... | 279/4.1 |
| 2,888,895 A * | 6/1959 | Coody et al. ................... | 269/201 |
| 2,974,217 A * | 3/1961 | Crawford ....................... | 219/101 |
| 3,566,505 A * | 3/1971 | Martin ............................ | 29/252 |
| 3,748,426 A | 7/1973 | Stanley | |
| 3,974,356 A | 8/1976 | Nelson et al. | |
| 4,039,115 A * | 8/1977 | Randolph et al. ............. | 228/44.5 |
| 4,145,593 A * | 3/1979 | Merrick et al. ............... | 219/60 A |
| 4,565,003 A * | 1/1986 | McLeod ....................... | 29/281.1 |
| 4,666,138 A * | 5/1987 | Dearman ........................ | 269/43 |
| 5,435,479 A * | 7/1995 | Puzey et al. .................. | 228/44.5 |
| 5,685,996 A * | 11/1997 | Ricci ........................ | 219/121.39 |
| 5,975,405 A * | 11/1999 | Tsuchiya et al. ............. | 228/44.5 |
| 6,840,433 B2 * | 1/2005 | Vermaat ........................ | 228/212 |
| 7,866,532 B1 * | 1/2011 | Potter et al. ................. | 228/112.1 |
| 8,123,104 B1 * | 2/2012 | Potter et al. ..................... | 228/2.1 |
| 8,132,708 B1 * | 3/2012 | Potter et al. ................. | 228/112.1 |
| 8,141,764 B1 * | 3/2012 | Potter et al. ..................... | 228/2.1 |
| 2012/0104674 A1 * | 5/2012 | Webb ............................. | 269/25 |

FOREIGN PATENT DOCUMENTS

DE            3937094 A    *  5/1990

* cited by examiner

*Primary Examiner* — Kiley Stoner
(74) *Attorney, Agent, or Firm* — Amster, Rothstein & Ebenstein LLP

(57) ABSTRACT

This invention relates to a method for axial positioning of a first pipe with respect to a second pipe for the welding of said pipes at their ends thereof of which the faces have been previously machined and define a joint plane, according to which a plurality of jacks are distributed around the first and second pipes, and said jacks are connected to a central processing and control unit.

According to the invention, the movement of each of the jacks is controlled with respect to said external surface of the first and/or second pipe so as to align and center the internal end surfaces of the first and second pipes. The invention also relates to an associated device.

4 Claims, 3 Drawing Sheets

METHOD AND DEVICE FOR POSITIONING A FIRST PIPE WITH RESPECT TO A SECOND PIPE

TECHNICAL FIELD OF THE INVENTION

The invention relates to the field of positioning pipes with respect to one another, and more specifically pipes to be placed end-to-end in order to weld them at their ends. In general, the pipes are first aligned, and then clamped so as to hold them in an optimal position before welding them end-to-end.

For many years, various methods and devices have been used for these purposes.

PRIOR ART

Mechanical solutions in which a ring with screw jacks regularly distributed over the circumference is placed around the external surface (or wall) of a pipe that is, for example, made of metal are known. In a known manner, the ring consists of two half-rings connected by a hinge, which can therefore be taken apart from one another so as to place or remove a pipe; in the closed position, the two half-rings form a ring that surrounds one or two pipes at the level of their ends thereof, and the screw jacks enable deformation and/or alignment providing best possible fit-up.

In this case of use, mechanical screwing performed by an operator makes it possible to exert local pressures in as many areas as there are jacks around the pipe. This can finally enable said pipe to be deformed, for example, to reround a pipe end that is initially oval.

If it involves welding pipes end-to-end, such a ring makes it possible to clamp and hold a pipe in position, which pipe may be deformed so as to obtain better coincidence between the profiles of the ends of each of the pipes; if each pipe end is equipped with such a ring and if both rings are linked together, a more precise matching of the end surfaces can be obtained, by successive and respective deformations of each of the ends. Thus, better welding can be achieved.

More recently, numerous publications have addressed this problem of positioning and clamping pipes in order to weld them by their ends.

We thus know document WO 01/34340, which discloses a method and a device according to which clamping of the external wall of a first pipe is performed, as well as external clamping of a second pipe by means of a rigid frame on which a first and a second clamping assembly are mounted; the end-to-end welding of the two pipes can thus be performed. Then, the device can slide over the external wall of one of the pipes in the direction of another end where another welding operation is to be performed.

This device allows for clamping and positioning of each pipe to be welded, but in a fairly rough manner. Only the general shape and the external diameter of one of the pipes appears to be taken into account in order to adjust the positioning and clamping of the other pipe.

In the field of welding, it is now considered to be necessary and crucial to have excellent contact surfaces between the ends of each pipe at the joint plane. This problem is not clear from the prior art, which, at best, seeks to obtain a good coincidence between the external diameters of the pipes to be welded.

The invention in particular solves this problem by seeking to obtain a more precise matching between the contact surfaces of the pipes to be welded, at the joint plane.

The prior art does not teach or suggest such a solution. The prior art does not suggest any modification that would enable the invention to be produced.

DESCRIPTION OF THE INVENTION

The invention is intended to overcome the disadvantages of the prior art and in particular to greatly improve the positioning and clamping of pipes placed end-to-end. The invention provides unpredictable, unexpected and entirely beneficial results with regard to the quality of the welds produced after said positioning.

To do this, according to a first aspect of the invention, a method is proposed for axial positioning of a first pipe with respect to a second pipe for the welding of said pipes at the ends thereof of which the faces have been previously machined and define a joint plane; in this method, a plurality of jacks are distributed around the first and second pipes, and said jacks are connected to a central processing and control unit.

More specifically, in the immediate vicinity of the external surface of the first and/or second pipe end(s), the movement of each of the jacks is controlled with respect to said external surface so as to align and center the internal end surfaces of the first and second pipes.

By "immediate vicinity", we mean a distance in the order of a few millimeters between the end of a jack and the external surface of a pipe. By "internal end surface", we mean the inner wall or an internal surface of the first or the second pipe, at the end thereof placed opposite the other (first or second) pipe to be positioned. The axially measured distance is on the order of zero to several millimeters.

This procedure, based on the knowledge and precise alignment of the pipes according to the internal end surfaces thereof, enables the weld quality to be greatly improved. As will be described below, such an adjustment enables the bevels root faces, which form the base of the weld, to be facing each other.

Again, the prior art does not in any way suggest this characteristic aspect since, instead, it teaches aligning the pipes at the external surfaces thereof.

It has been noted that the pipes to be welded often have variable shapes and wide dimensional tolerances so that, when seeking to position the pipes in general, the coincidences of the contact surfaces of the internal end surfaces thereof are not good, and the subsequent welds have detrimental defects. This problem leads in particular to an additional cost for quality control, and high rejection rates; in addition, while assembling pipelines, serious repair problems appear with the methods of the prior art.

According to a feature of the invention, each jack makes it possible to carry out a first approach of the external surface of a pipe owing to specific means such as a position sensor connected to the central processing unit. This approach is controlled; the jacks are not necessarily synchronized during this phase.

In addition, all or some of the jacks ensure (together) clamping on the external surface of the first and/or second pipe end owing to means (such as a solenoid valve) internal to each jack so as to regulate the clamping pressure on said external surface. During this phase, the jacks are preferably synchronized with one another, so as to produce a selective and effective general clamping of the first and/or second pipe to be welded.

According to a beneficial method, prior to the positioning of the pipes, geometric pipe end measurements of a set of pipes and an angular reference marking at the end of each of said pipes are performed, said measurements are stored in the central unit, then in situ, (and before clamping of the first and second pipe), the angular offset of each end of the first and second pipes according to a machine-reference plane are measured and stored, then the computing unit determines and enables each jack to be controlled individually according to said offset, so as to align the internal end surfaces of the first and second pipes.

The machine-reference plane is a specific plane determined by the equipment manufacturer.

Of course, the alignment is the objective of the invention; it will be achieved more or less precisely so that the final alignment will be more or less perfect. It will be "as the best achievable".

This method is preferably carried out according to a first step, which is independent of and prior to the positioning and clamping step. In this step, a database relating to pipe ends shape geometry is achieved; at the time and place chosen for welding, these data are used for the command and control of the actual positioning and clamping step.

According to a preferred embodiment of the invention, hydraulic jacks are used. Electric jacks can be used without going beyond the scope of the invention.

The invention also relates to a device for axial positioning of a first pipe with respect to a second pipe in order to weld them end-to-end at a joint plane, including a plurality of jacks oriented radially and arranged outside said pipes and near said joint plane, capable of clamping and positioning each pipe with respect to the other pipe, and a Programmable Logic Controller (also referred to in this document as a central processing unit) capable of storing geometric data relating to dimensional and/or positioning measurements of the first and/or second pipe end; thus, the displacements of each of said jacks are controlled by said Programmable Logic Controller according to said data and so that an alignment of said pipes is performed based on a centering of said pipes and an alignment of the internal end surfaces thereof.

More specifically, and according to an embodiment implemented, five jacks are provided around each pipe, angularly distributed. In other words the jacks are optimally distributed according to the dimensional and environmental constraints of the particular case.

BRIEF DESCRIPTION OF THE FIGURES

Other features, details and advantages of the invention will become clear in the following description, with reference to the appended figures, which show.

For greater clarity, the same or similar features are denoted by the same reference signs in all of the figures.

DETAILED DESCRIPTION OF AN EMBODIMENT

Figure 1:
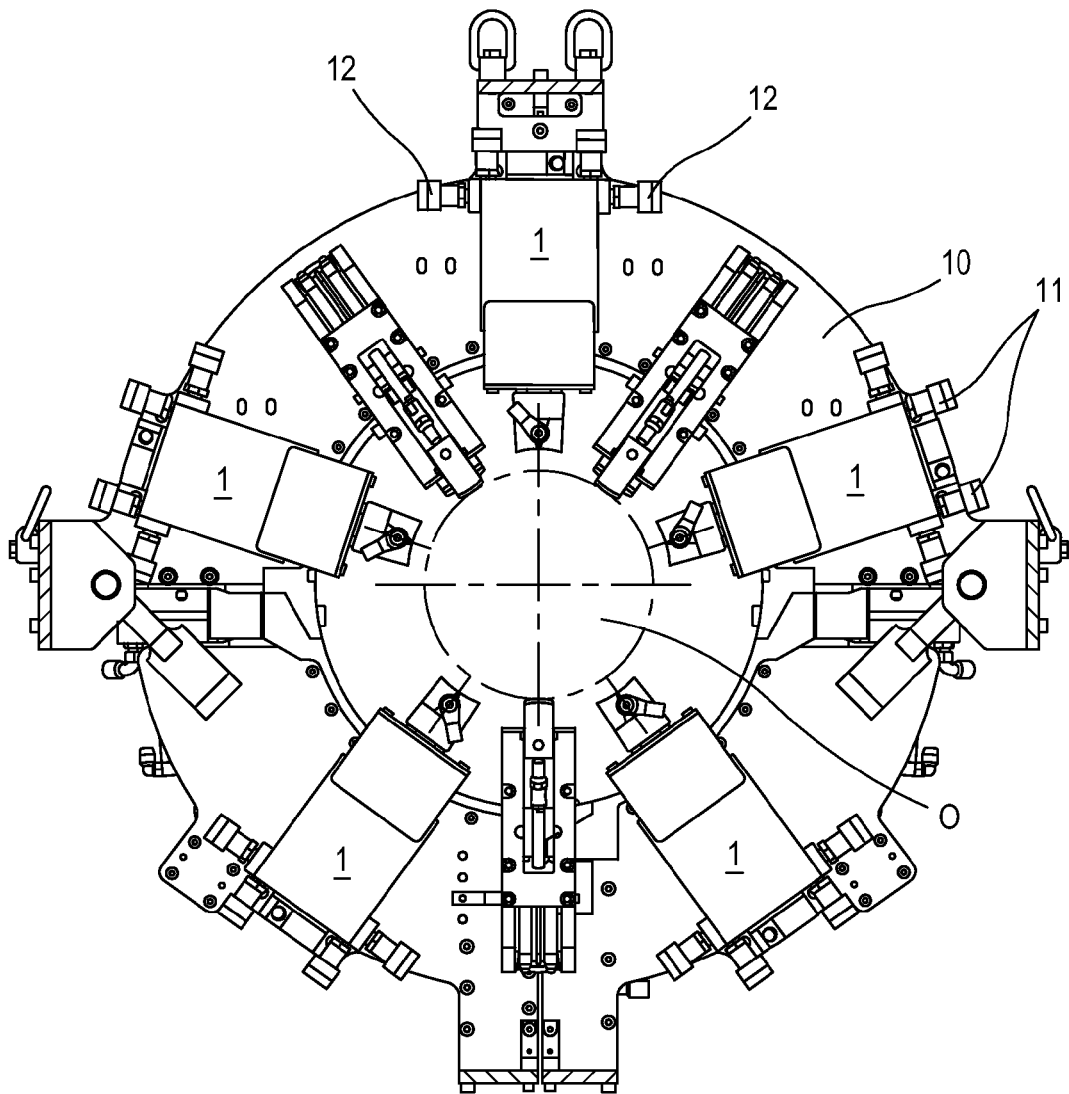
FIG. 1: a side view of the device according to a first embodiment of the invention.

FIG. 1 shows, in a side view, a device according to an embodiment of the invention. More specifically, five hydraulic jacks 1 are mounted on a first ring 10 arranged concentrically to the pipe 0 which must be positioned, clamped and aligned with another pipe 0' not visible in FIG. 1, in particular at the level of a weld (in this case, annular) to be produced. The number of jacks will be chosen by a person skilled in the art according to technical constraints such as bulk, forces to be applied, cost, and so on.

Preferably, for off-shore welding applications, hydraulic jacks will be chosen, which, in the examples of use envisaged and tested, can withstand a radial force on the order of 20% of their total capacity. Indeed, in this type of application, during welding, the pulling forces applied on each pipe are considerable, commonly on the order of several tons. The relative movements of the pipes are also significant; the device according to the invention must be capable of being operational and reliable in spite of these difficult operating conditions.

The jacks chosen here are double-acting jacks and are preferably coupled to a flexible hose (not shown) by a suitable connection such as a quick coupler.

Each jack 1 has an internal position sensor (not visible) directly connected to a central control and processing unit. In addition, solenoid valves cooperate individually with each jack 1 so as to provide a suitable and controlled pressure.

Figure 2:
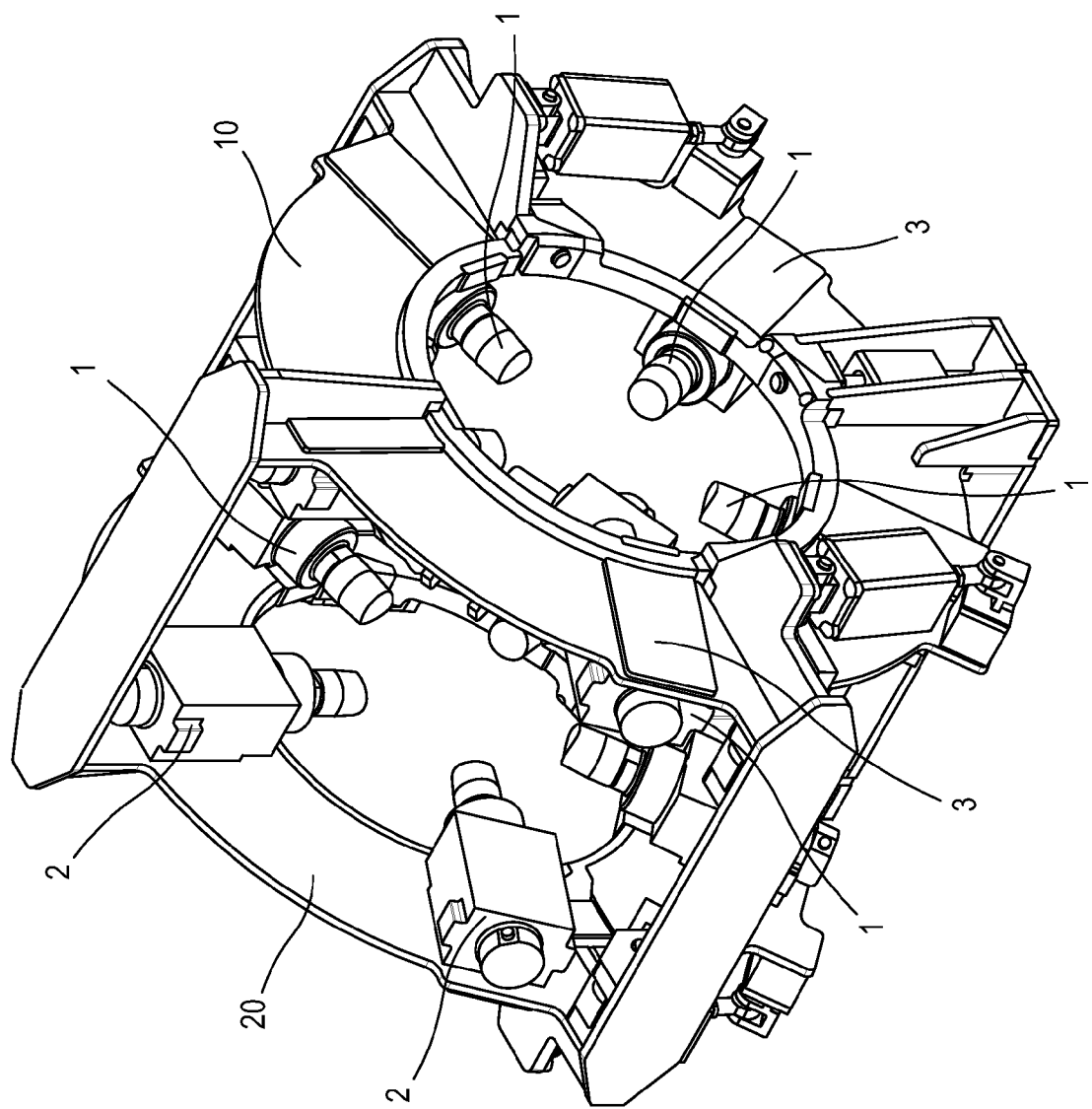
FIG. 2: a first perspective view of the device.

As shown in FIG. 2, a set of five jacks 1 is attached to a first ring 10, while a set of five jacks 2 is attached to a second support ring 20 axially distant from the first support ring 10. At least one connection part can be provided between the first 10 and the second 20 rings so that each set of jacks, 1, 2 respectively, is eventually arranged plumb over the first pipe and the second pipe to be welded, in the vicinity of the ends to be welded. This type of assembly is known and will not therefore be described in further detail.

If necessary, reinforcement plates 3 can be attached to the first 10 and/or second 20 rings so as to reinforce and rigidify them plumb over the jacks 1, 2. Of course, a person skilled in the art will choose the number, dimensions and structure of such plates according to the type of forces exerted on the structure.

As an example, a device according to FIG. 2 was produced: on each support ring 10, 20, five hydraulic jacks 1, 2 are attached. Each jack 1, 2 works under a pressure of 20 to 800 bars, has a pushing/pulling capacity up to 100 tons and can withstand a radial load of up to 30 tons, with a stroke up to 150 mm. Each jack includes an internal displacement sensor that has a precision in the order of 0.01 to 0.1 mm and a resolution up to 0.1; the displacement sensor is connected to a processing and control unit such as a microcomputer or a Programmable Logic Controller, for example of the Allen Bradley commercial brand, in the Control Logix family; at least one inlet 11 and one outlet 12 are provided on each jack 1, each connected by a "quick coupler" to a flexible hose capable of withstanding a pressure of 20 to 800 bars.

The invention also relates to a method for positioning and clamping a first pipe 0 with respect to a second pipe 0' in order to weld said pipes at previously machined end faces thereof.

According to an embodiment of the invention, the geometric features such as internal diameter, external diameter, thickness, ovalization, profile, etc., of a given pipe end are stored in a central processing unit. In addition, a mark is placed on the end face of each pipe. This mark is an angular reference, a so-called "0" reference, for each pipe end. For this step, specific equipment independent of the positioning and clamping device is provided. A plurality of measurements are preformed, each identifying the shape of a given pipe end.

In addition, a machine calibration is performed by means of a standardized pipe, which makes it possible to calibrate the equipment according to the external surface of a determined and perfectly known pipe.

At the time and place of the pipe positioning, i.e. in situ, the end of a first pipe is placed at the level of the first ring 10; at this stage, clamping shoes placed at the ends of each of the jacks 1 are located at a given theoretical distance from the external diameter of the first pipe. An angular offset of said first pipe end 0 is thus identified according to a reference plane of the equipment. This plane is determined and defined by the equipment manufacturer.

Then, the angular offset relating to the second pipe end 0' is identified. These offsets are recorded in the central unit, either by the operator himself or automatically. Then, the shoes are moved towards the external surfaces of the first pipe and of the second pipe. If it has not already been done, the sets of shoes are brought on each side of the joint plane by moving the machine according to the axis of the pipes. The shoes are moved towards the external wall of the pipes in a non-synchronized manner, for example at a speed of less than 6 mm/s; the pressure of the jacks is in this case between 50 and 400 bars. When the shoes reach a given theoretical diameter greater, for example, by a few millimeters than that of the external diameters of the pipes, then the jacks 1, 2 operate in synchronized mode, with a very low movement speed, for example from 0.2 to 1 mm/s, so as to have a final positioning precision on the order of 0.1 mm. Of course, the speed of movement of the jacks is adjustable by a person skilled in the art according to the particular case. The final pressure on each jack is an adjustable parameter; a person skilled in the art can combine these two parameters for a more precise clamping of the first and second pipe.

The clamping is considered to be complete when a pressure and/or a given displacement is achieved at each of the jacks.

According to a preferred embodiment, the beginning of the clamping is controlled according to displacement sensor data while the final and precise adjustment of the clamping is performed according to the force applied by each of the jacks on the external wall of the pipes ends to be subsequently welded.

The computing, processing and control unit, optionally associated with data entered by the operator, finally enables a positioning and centering of the pipes based on their internal end surfaces. In the case of cylindrical pipes, they are internal diameters. This criterion appears to be critical for producing a high-quality weld because the bevel root faces forming the base of the weld is thus optimized. Indeed, to produce a weld free or almost free of defects, it is necessary to minimize the offsets at the level of the internal end surfaces of each of the pipes placed face to face. This invention enables such an objective to be achieved. It is in this sense that it is necessary to understand "the alignment of the internal end surfaces" according to the invention.

Figure 3:
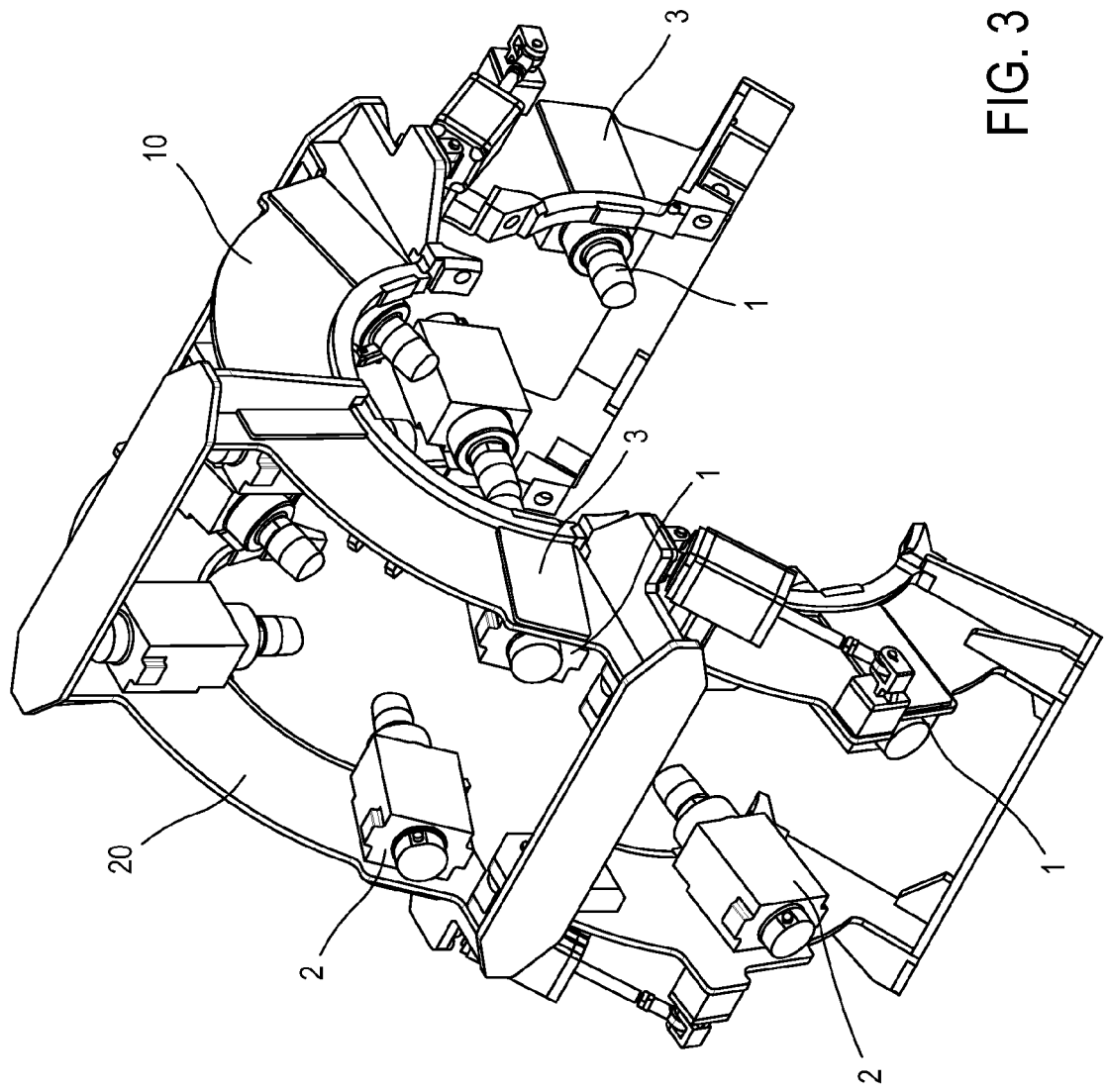
FIG. 3: a second perspective view of the device.

As an example, FIG. 3 shows, in perspective, a device according to the invention in the open position. This position makes it possible to easily and roughly place the first and second pipes opposite one another, and the device as close as possible to the joint plane between the pipes thus placed. Then, such a device is capable of being closed and surrounding said pipes, according to FIG. 2.

The invention claimed is:

1. Device for axial positioning of a first pipe with respect to a second pipe in order to weld them end-to-end at a joint plane, comprising a plurality of jacks (1, 2) oriented radially and arranged outside said pipes, the device capable of clamping and positioning each pipe with respect to the other pipe, and a Programmable Logic Controller capable of storing geometric data relating to dimensional and/or positioning measurements of the first and/or second pipe ends, characterized in that a displacement of each of said jacks are controlled by said Programmable Logic Controller so that an alignment of said pipes is performed based on a centering of said pipes and an alignment of their internal end surfaces thereof.

2. Device according to claim 1, characterized in that the jacks are constituted by hydraulic jacks.

3. Device according to claim 1, characterized in that the jacks are constituted by electric jacks.

4. Device according to claim 1, characterized in that five jacks are provided around each pipe, and angularly distributed.

* * * * *